United States Patent [19]
Sullivan

[11] Patent Number: 5,524,484
[45] Date of Patent: Jun. 11, 1996

[54] SOLENOID OPERATED VALVE DIAGNOSTIC SYSTEM

[75] Inventor: Alan D. Sullivan, Atlanta, Ga.

[73] Assignee: Westinghouse Electric Corporation, Pittsburgh, Pa.

[21] Appl. No.: 168,503

[22] Filed: Dec. 22, 1993

[51] Int. Cl.⁶ .......................... F16K 37/00; G01M 19/00
[52] U.S. Cl. .................................................. 73/168
[58] Field of Search ................................................ 73/168

[56] References Cited

U.S. PATENT DOCUMENTS

| | | | |
|---|---|---|---|
| 4,397,180 | 8/1983 | Wolff et al. | 73/119 A |
| 4,542,649 | 9/1985 | Charbonneau et al. | 73/168 |
| 4,570,903 | 2/1986 | Crass | 251/129.12 |
| 4,649,993 | 3/1987 | Going, III | 166/65.1 |
| 4,651,535 | 3/1987 | Alsenz | 62/225 |
| 4,686,835 | 8/1987 | Alsenz | 62/223 |
| 4,690,003 | 9/1987 | McNennamy et al. | 73/862.32 |
| 4,693,113 | 9/1987 | McNennamy et al. | 73/168 |
| 4,735,060 | 4/1988 | Alsenz | 62/225 |
| 4,787,245 | 11/1988 | Anderson et al. | 73/168 |
| 4,798,247 | 1/1989 | Deaton et al. | 166/373 |
| 4,805,451 | 2/1989 | Leon | 73/168 |
| 4,831,873 | 5/1989 | Charbonneau et al. | 73/168 |
| 4,856,327 | 8/1989 | Branam et al. | 73/168 |
| 4,888,996 | 12/1989 | Rak et al. | 73/862.19 |
| 4,896,101 | 1/1990 | Cobb | 324/73.1 |
| 4,912,984 | 4/1990 | McMennamy et al. | 73/862.65 |
| 4,930,228 | 6/1990 | Anderson et al. | 73/862.49 |
| 4,936,150 | 6/1990 | Burke et al. | 73/761 |
| 4,941,348 | 7/1990 | Hock | 73/119 |
| 4,976,144 | 12/1990 | Fitzgerald | 73/168 |
| 5,000,040 | 3/1991 | Charbonneau et al. | 73/168 |
| 5,035,119 | 7/1991 | Alsenz | 62/225 |
| 5,082,097 | 1/1992 | Goeckner et al. | 192/32 |
| 5,109,692 | 5/1992 | Fitzgerald | 73/168 |
| 5,142,906 | 9/1992 | Smith | 73/168 |
| 5,154,080 | 10/1992 | Hill et al. | 73/597 |
| 5,197,328 | 3/1993 | Fitzgerald | 73/168 |
| 5,248,940 | 9/1993 | Patience et al. | 324/207.15 |
| 5,329,956 | 7/1994 | Marriott et al. | 137/15 |

FOREIGN PATENT DOCUMENTS

| | | |
|---|---|---|
| 0067298 | 5/1982 | European Pat. Off. . |
| 489596 | 10/1992 | European Pat. Off. . |
| 3730523 | 3/1989 | Germany . |
| 2260030 | 3/1993 | United Kingdom . |

Primary Examiner—William A. Cuchlinski, Jr.
Assistant Examiner—Willie Morris Worth
Attorney, Agent, or Firm—C. A. Marmo; D. G. Maire

[57] ABSTRACT

Disclosed is a diagnostic system for measuring and monitoring selected operating parameters of a solenoid operated valve. The valve assembly, comprised of a valve body, a valve plug attached to a valve stem is actuated or operated by a solenoid. The valve assembly is provided with one or more sensors attached to or positioned adjacent to the valve assembly to measure and monitor selected operating parameters of the valve assembly and provide electrical output signals indicative of the measurements to a signal conditioning, processing and data collection apparatus used to receive and record the electrical output signals. The diagnostic system allows the user of the valve to measure and monitor the various electrical and mechanical activities of the valve during its operation while in service and to see if the valve is operating within its design parameters. The valve diagnostic system also provides the valve user with the ability to monitor the condition of the valve over time in service to detect any degradation or problems in the valve and its components and correct them before a failure of the valve occurs.

2 Claims, 1 Drawing Sheet

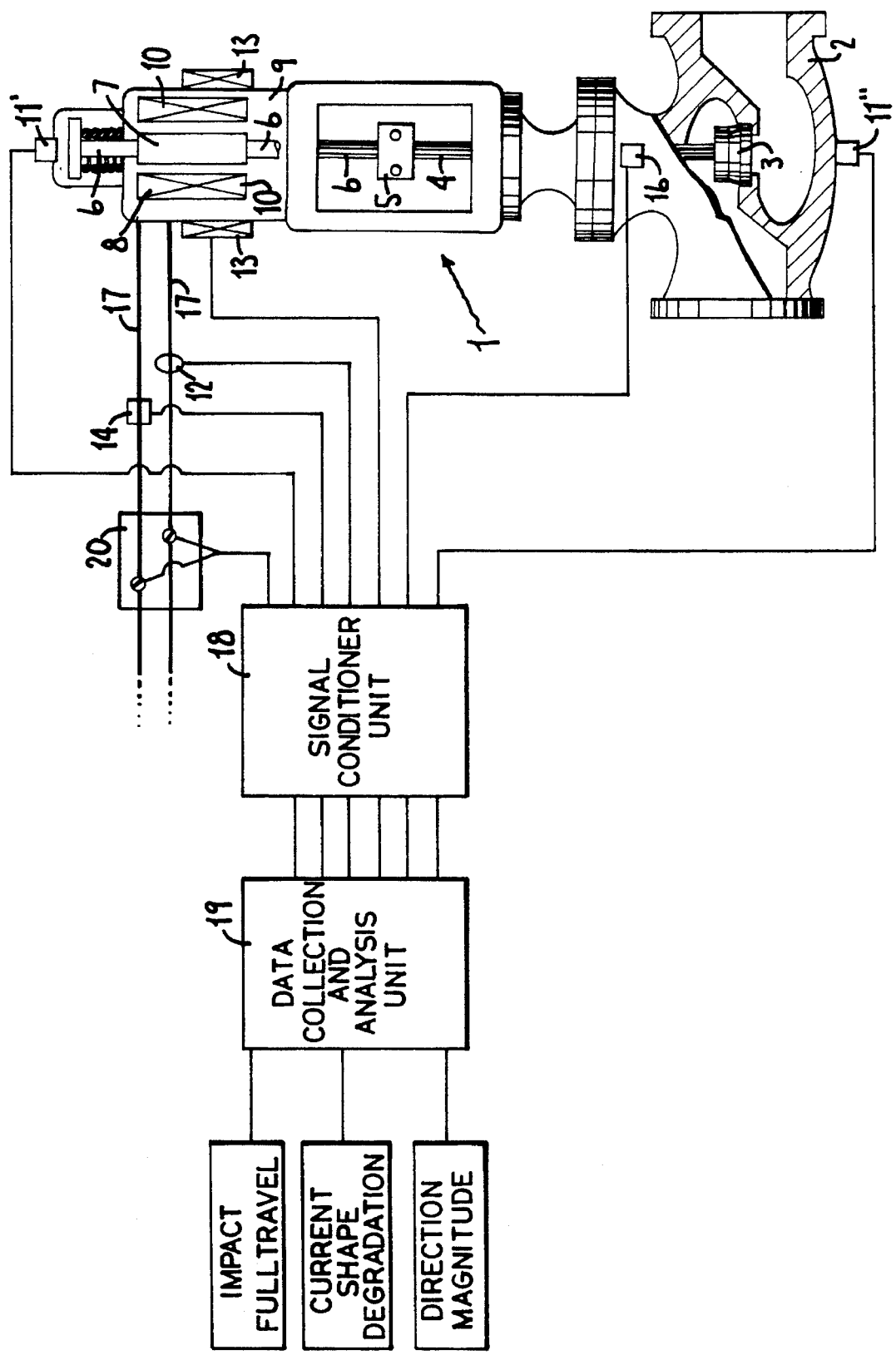

SOLENOID OPERATED VALVE DIAGNOSTIC SYSTEM

BACKGROUND OF THE INVENTION

This invention relates to a system to measure and monitor selected operating parameters of a solenoid operated valve. It relates particularly to a valve diagnostic system that is able to test, measure and analyze a number of selected operating parameters associated with solenoid operated valves to determine whether or not the valve is operating within its design parameters and to record over time any changes in the selected parameters that could affect the continuous and reliable operation of the valve. The invention is especially useful in the field of valve diagnostics.

Industrial valves are widely used for a number of different applications in the power industry and many other industries. Industrial valves are usually operated by electromagnetic solenoids or electric motors or compressed air to open, closed and intermediate positions in order to control the flow of fluids, such as cooling water, that pass through the valve. Continuous and reliable operation of the valve is essential.

The valve user industries and the valve manufacturing industry have had a need to develop apparatus, methods and systems to measure, test and monitor various operating parameters associated with valves and to detect any significant changes in any of these valve operating parameters being measured, tested and monitored, that could affect the continuous and reliable operation of the valve.

U.S. Pat. No. 4,542,649 to Charbonneau et al. discloses a recently developed valve testing and monitoring system for an electric motor operated valve that measures, records and correlates a number of valve operating parameters, such as valve stem load, valve stem movements, valve stem torque, spring pack movement and motor current. The information provided by the system described in the Charbonneau et al. patent provides a direct indication to the operator or test engineer of any valve problems, such as excessive or inadequate packing loads, excessive inertia, incorrectly set limit and torque switches, malfunctioning thermal overload devices, excessive stem thrust loads, gear train wear and damage to the valve stem.

As a result of the teachings of the Charbonneau et al. patent, efforts have been made by Movats, Inc., the assignee of the Charbonneau et al. patent, and the assignee of the present patent application, to develop additional apparatus and valve diagnostic systems by which the operation and performance of different types of valves could be easily measured, tested, monitored and analyzed. U.S. Pat. Nos. 4,690,003; 4,693,113; 4,787,245; 4,831,873; 4,488,996; 4,912,984; 4,930,228; 5,000,040 and 5,142,906 describe a number of the valve monitoring and diagnostic systems developed by Movats, Inc. for electric motor operated valves. U.S. Pat. Nos. 4,805,451; 4,856,327; 4,976,144; 5,109,692 and 5,197,328 describe several of the valve monitoring and diagnostic systems developed by others for electric motor operated and compressed air operated valves. However, there has been very few valve monitoring and diagnostic systems developed for solenoid operated valves.

In the past, solenoid operated valves were tested by maintenance personnel using hand-held electrical meters to measure the electrical solenoid coil current and control signals and a vernier ruler or scale to measure the axial position of the valve stem during the operation of the valve. These measurements were often difficult to make and crude and left the potential for significant error. Furthermore, these measurements and practices frequently did not detect electrical or mechanical degradations in the valve components or provide an overall diagnosis of the condition of the valve.

SUMMARY OF THE INVENTION

It is therefore an object of this invention to provide a diagnostic system for measuring and monitoring a number of selected operating parameters associated with a solenoid operated valve.

It is another object of this invention to provide a diagnostic system for measuring and monitoring a number of selected operating parameters associated with a solenoid operated valve which system is easily adapted to and installed on a number of commercially available solenoid operated valves.

It is a still further object of this invention to provide a diagnostic system for measuring and monitoring a number of selected operating parameters associated with a solenoid operated valve from a remote diagnostic or control location that is reliable and requires little or no maintenance or calibration over an extended period of time.

It has been discovered that the foregoing objects can be attained by a diagnostic system for measuring and monitoring a number of selected operating parameters associated with a solenoid operated valve assembly comprised generally of a valve body, a valve plug attached to a valve stem that is operated by solenoid having a electromagnetic coil and a movable core. One or more sensor means are attached to or near the valve assembly and are adapted to measure one or more selected operating parameters associated with the valve assembly and provide electrical output signals of such measurements. The electrical output signals are received and recorded by a signal conditioning, processing and data collection means and used for diagnostic analysis of the valve and its components.

BRIEF DESCRIPTION OF THE DRAWINGS

FIG. 1 is elevation view, partly in section, of a preferred embodiment of the solenoid operated valve diagnostic system of this invention.

DESCRIPTION OF THE PREFERRED EMBODIMENTS

FIG. 1 illustrates an elevation view, partly in section, of a preferred embodiment of a solenoid operated valve equipped with a preferred embodiment of the diagnostic system of this invention. As shown in FIG. 1, the valve assembly 1 is comprised of a valve body 2 containing a valve plug 3 connected to a valve stem 4 which is in turn connected by a connector member 5 to an actuator shaft 6. The actuator shaft 6 is either integral with or adapted to be moved axially by the core 7 of the solenoid actuator assembly 8. The solenoid actuator assembly 8 is comprised essentially of an outer housing 9 which contains a solenoid coil 10 that surrounds the solenoid core 7. Energizing the solenoid coil with an electric current provided by electrical cables 17 will produce axial movement of the solenoid core and in turn axial movement of the actuator shaft 6 and the valve stem 4 to change the position of the valve plug 3.

Attached to selected portions of the valve body 2 and solenoid housing 9 are one or more acoustic transducer sensors 11', used to detect and measure vibrations in the valve assembly 1 caused by the opening or closing of the valve plug 3 or vibrations caused by energization of the solenoid coil 10. In this embodiment, an acoustic transducer sensor 11', such as a Model 4382 sensor manufactured by Bruel & Kjaer, is placed on top of the solenoid housing 9, as shown in FIG. 1. With some valves, alternate locations may be used to improve signal strength from the sensor. The sensor 11 detects and measures the frequency spectrum and magnitude of the vibrations in the valve assembly 1 due to impacts caused by the movable core 7 of the solenoid actuator 8 and impacts between the valve plug 3 and the valve seat. These vibration measurements provide data on the condition of the coil 10 and of the impact surfaces of the core 7, the actuator shaft 6, the valve plug 3 and the valve seat, such as a coating or presence of foreign material on such surfaces. Such vibration measurements, especially the magnitude of the vibrations, also provide data concerning the amount of magnetic flux available to move the core 7 and to indicate any problems with the coil 10 or the supply of current to the coil 10 of the solenoid actuator 8.

As shown in FIG. 1, the diagnostic system of this invention preferably also includes a sensor 12 surrounding one of the electrical cables 17 that carry current to the solenoid coil 10 and capable of continuously measuring the current being used to energize the solenoid coil 10. A suitable sensor 12 is the Model No. 48101 sensor manufactured by Fluke Corporation. The sensor 12 provides a continuous measurement of the current going to the solenoid coil 10 and will indicate current change times and when compared to the voltage to determine the phase relation over time will also indicate the position of the movable core 7. The voltage can be easily measured using a voltmeter readings taken at a convenient junction box 20 for the electrical cables 17, as illustrated in FIG. 1. Voltage and current wave forms can be compared to determine the phase relationship between the two. This phase relationship changes as the movable core 7 moves relative to coil 10 and thus provides a indication of the position of the movable core 7 at all times. These measurements will also indicate any problems with the movable core 7 and the stability of the solenoid coil 10.

The diagnostic system of this invention preferable also uses an ultrasonic transducer sensor 11" typically mounted on the bottom of the valve body 2 as shown in FIG. 1 to measure and monitor the position and movements of the valve plug 3. A suitable sensor 11" is the Model CM-0108-5 sensor manufactured by Staveley Sensors, Inc.

If desired, the diagnostic system also can incorporate an EMF measuring coil 13 positioned around the solenoid housing 9, as illustrated in FIG. 1, to continuously measure the EMF response of the solenoid coil 10 during the operation of the valve. A suitable EMF measuring coil 13 is the Model No. 9640 EMF measuring coil manufactured by Bell Instruments Company. The EMF measuring coil 13 provides EMF measurements to indicate the state of the solenoid coil 10 energization or deenergization and could also be used to determine the position of the movable core 7 and in turn the position of the valve stem 4.

If desired, the diagnostic system of this invention will include a continuity or current sensor 14 attached to the control switch electrical cable 17 to continuously measure the control current used to control the valve. A suitable sensor 14 is the Model No. 48100 sensor manufactured by Fluke Corporation. The sensor 14 provides measurements that indicate the relative time values of the control switch activation, the solenoid coil 10 state changes, the beginning of the valve stem 4 movements and the end of the valve stem 4 movements.

As illustrated in FIG. 1, the system can also include an eddy current probe type sensor 16 mounted on the valve body 2 to measure and monitor the position of the valve plug 3. The eddy current probe type of sensor must be designed for the size and material of the valve assembly 1. Eddy current probes suitable for this diagnostic system are manufactured by ITI Movats.

All of the sensors described above are designed to produce an electrical output signal indicative of the value of the parameter being measured. The output electrical signals from the various sensors are received and recorded in a signal conditioning and processing unit 18 and a data collection and analysis means, such a Model 2510 Testlab data collection unit manufactured by Tektronix Corporation. The data so received and recorded may then be displayed, plotted, analyzed using a computer.

The valve diagnostic system of this invention may include just some or all of the above-described measurement and monitoring sensors and components depending on the needs of the valve user and the application of the valve. As a result of this invention, the user of a solenoid operated valve is able to not only measure and monitor the various electrical and mechanical activities of the valve during its operation while in service but also check to see if the valve is operating within its design parameters. The diagnostic system of this invention also provides the valve user with a means to monitor the condition of the valve over time in service to detect any degradations or problems in the valve before a failure occurs.

While I have described this invention by illustrating and describing a preferred embodiment of it, this has been done by way of example and I should not be limited thereby, as there may be adaptations and variations of this embodiment that could be made within the scope of this invention.

I claim:

1. A system for determining the operability of a solenoid operated valve having a valve plug attached to a moveable core within an electromagnetic coil, the system comprising:

a current sensor for measuring the current supplied to said coil;

a voltage sensor for measuring the voltage supplied to said coil;

a means for determining the phase relationship between said current and said voltage; and means for indicating the continuous position of said valve plug as a direct function of said phase relationship.

2. A system for determining the operability of a solenoid operated valve having a valve plug attached to a moveable core within an electromagnetic coil, the system comprising:

a means for determining the phase relationship between the current and the voltage supplied to said coil; and means for indicating the continuous position of said valve plug as a direct function of said phase relationship.

\* \* \* \* \*